(12) United States Patent
Mascarenhas et al.

(10) Patent No.: US 8,612,862 B2
(45) Date of Patent: Dec. 17, 2013

(54) INTEGRATED CLIENT FOR ACCESS TO REMOTE RESOURCES

(75) Inventors: Ayesha M Mascarenhas, Seattle, WA (US); Kevin Scott London, Monroe, WA (US); Raymond Matthew Reskusich, Seattle, WA (US); Subhashini Raghunathan, Hyderabad (IN); Ido Ben-Shachar, Kirkland, WA (US); Alberto Henriquez, Bothell, WA (US); Nelly L. Porter, Kirkland, WA (US); Ersev Samim Erdogan, Seattle, WA (US); Niraj Agarwala, Redmond, WA (US); Naga Vankata Rajagopal Ramadugu, Bellevue, WA (US); Ramasamy Pullappan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1055 days.

(21) Appl. No.: 12/163,673

(22) Filed: Jun. 27, 2008

(65) Prior Publication Data
US 2009/0327905 A1 Dec. 31, 2009

(51) Int. Cl.
*G06F 3/00* (2006.01)

(52) U.S. Cl.
USPC ........... 715/738; 715/734; 715/735; 715/736; 715/740

(58) Field of Classification Search
USPC .......................... 715/734, 735, 736, 738, 740
See application file for complete search history.

(56) References Cited

U.S. PATENT DOCUMENTS

| | | |
|---|---|---|
| 5,220,674 A | 6/1993 | Morgan et al. |
| 5,682,478 A | 10/1997 | Watson et al. |
| 5,764,887 A | 6/1998 | Kells et al. |
| 5,790,853 A | 8/1998 | Nomura et al. |
| 5,815,574 A | 9/1998 | Fortinsky |
| 5,884,046 A | 3/1999 | Antonov |
| 5,949,975 A | 9/1999 | Batty et al. |

(Continued)

FOREIGN PATENT DOCUMENTS

| | | |
|---|---|---|
| CN | 1845069 | 10/2006 |
| KR | 20030003314 | 1/2003 |
| WO | WO2007075846 A2 | 7/2007 |

OTHER PUBLICATIONS

Office Action for U.S. Appl. No. 11/771,921, mailed on Apr. 29, 2011, Ashwin Palekar, "Virtual Desktop Integration with Terminal Services".

(Continued)

*Primary Examiner* — Andrey Belousov
(74) *Attorney, Agent, or Firm* — Lee & Hayes, PLLC

(57) ABSTRACT

Techniques for discovering, connecting to, disconnecting from, reconnecting to, updating, and removing workspaces are described. In one embodiment, a list of discovered workspaces is maintained on a user device. Shortcuts for resources corresponding to each respective one of the discovered workspaces are integrated into a user interface of the user device. A request to access one of the resources contained in one of the discovered workspaces is received. Responsive to receiving the request, a connection from the user device to one or more resource hosts containing the resources corresponding to the indicated one of the discovered workspaces is opened. Access from the user device to the resources stored on the resource host(s) corresponding to the indicated one of the discovered workspaces is enabled by presenting shortcuts for resources corresponding to the discovered workspaces as though they were local resources.

20 Claims, 9 Drawing Sheets

(56) References Cited

U.S. PATENT DOCUMENTS

| | | | |
|---|---|---|---|
| 6,049,828 A | 4/2000 | Dev et al. |
| 6,154,787 A | 11/2000 | Urevig et al. |
| 6,167,445 A | 12/2000 | Gai et al. |
| 6,310,889 B1 | 10/2001 | Parsons et al. |
| 6,452,692 B1 | 9/2002 | Yacoub |
| 6,463,454 B1 | 10/2002 | Lumelsky et al. |
| 6,463,459 B1 | 10/2002 | Orr et al. |
| 6,470,384 B1 | 10/2002 | O'Brien et al. |
| 6,473,794 B1 | 10/2002 | Guheen et al. |
| 6,510,523 B1 | 1/2003 | Perlman et al. |
| 6,519,571 B1 | 2/2003 | Guheen et al. |
| 6,536,037 B1 | 3/2003 | Guheen et al. |
| 6,552,813 B2 | 4/2003 | Yacoub |
| 6,560,609 B1 | 5/2003 | Frey et al. |
| 6,571,245 B2 | 5/2003 | Huang et al. |
| 6,594,684 B1 | 7/2003 | Hodjat et al. |
| 6,615,166 B1 | 9/2003 | Guheen et al. |
| 6,654,807 B2 | 11/2003 | Farber et al. |
| 6,675,198 B1 | 1/2004 | Hagiwara et al. |
| 6,714,987 B1 | 3/2004 | Amin et al. |
| 6,721,713 B1 | 4/2004 | Guheen et al. |
| 6,732,117 B1 | 5/2004 | Chilton |
| 6,816,905 B1 | 11/2004 | Sheets et al. |
| 6,836,786 B1 | 12/2004 | Zoller et al. |
| 6,854,016 B1 | 2/2005 | Kraenzel et al. |
| 6,915,345 B1 | 7/2005 | Tummala et al. |
| 6,922,724 B1 | 7/2005 | Freeman et al. |
| 6,954,930 B2 | 10/2005 | Drake et al. |
| 6,957,186 B1 | 10/2005 | Guheen et al. |
| 6,970,902 B1 | 11/2005 | Moon |
| 6,973,482 B2 | 12/2005 | Mohammed et al. |
| 6,976,262 B1 | 12/2005 | Davis et al. |
| 6,999,912 B2 | 2/2006 | Loisey et al. |
| 7,080,404 B2 | 7/2006 | Abdo et al. |
| 7,096,248 B2 | 8/2006 | Masters et al. |
| 7,100,199 B2 | 8/2006 | Ginter et al. |
| 7,111,060 B2 | 9/2006 | Araujo et al. |
| 7,130,891 B2 | 10/2006 | Bernardin et al. |
| 7,149,698 B2 | 12/2006 | Guheen et al. |
| 7,165,041 B1 | 1/2007 | Guheen et al. |
| 7,181,302 B2 | 2/2007 | Bayne |
| 7,257,613 B2 | 8/2007 | Boudnik et al. |
| 7,269,580 B2 | 9/2007 | Matichuk |
| 7,299,274 B2 | 11/2007 | Rajarajan et al. |
| 7,313,588 B1 | 12/2007 | Shotton, Jr. et al. |
| 7,330,872 B2 | 2/2008 | Peart et al. |
| 7,340,654 B2 | 3/2008 | Bigagli et al. |
| 7,363,363 B2 | 4/2008 | Dal Canto et al. |
| 7,502,726 B2 | 3/2009 | Panasyuk et al. |
| 7,584,274 B2 | 9/2009 | Bond et al. |
| 7,633,483 B2 | 12/2009 | Ben-Schachar et al. |
| 8,161,160 B2 | 4/2012 | London et al. |
| 8,272,045 B2 | 9/2012 | Azeez et al. |
| 2001/0047406 A1 | 11/2001 | Araujo et al. |
| 2002/0026590 A1 | 2/2002 | Kusunoki |
| 2002/0059073 A1 | 5/2002 | Zondervan et al. |
| 2002/0072974 A1 | 6/2002 | Pugliese, III et al. |
| 2002/0122056 A1* | 9/2002 | Bhesania et al. ............. 345/744 |
| 2002/0124082 A1 | 9/2002 | San Andres et al. |
| 2002/0129054 A1 | 9/2002 | Ferguson et al. |
| 2002/0174359 A1 | 11/2002 | Haltmeyer |
| 2002/0198965 A1 | 12/2002 | Kraft |
| 2003/0055968 A1 | 3/2003 | Hochmuth et al. |
| 2003/0126236 A1 | 7/2003 | Marl et al. |
| 2003/0126265 A1 | 7/2003 | Aziz et al. |
| 2003/0140143 A1 | 7/2003 | Wolf et al. |
| 2003/0182392 A1 | 9/2003 | Kramer |
| 2003/0195950 A1 | 10/2003 | Huang et al. |
| 2003/0217166 A1 | 11/2003 | Dal Canto et al. |
| 2004/0010786 A1 | 1/2004 | Cool et al. |
| 2004/0039827 A1 | 2/2004 | Thomas et al. |
| 2004/0045004 A1 | 3/2004 | Cheenath |
| 2004/0073621 A1 | 4/2004 | Sampson |
| 2004/0103339 A1 | 5/2004 | Chalasani et al. |
| 2004/0107125 A1 | 6/2004 | Guheen et al. |
| 2004/0111519 A1 | 6/2004 | Fu et al. |
| 2004/0167984 A1 | 8/2004 | Herrmann |
| 2004/0205473 A1 | 10/2004 | Fisher et al. |
| 2004/0213220 A1 | 10/2004 | Davis |
| 2004/0250130 A1 | 12/2004 | Billharz et al. |
| 2005/0010926 A1 | 1/2005 | Narayanaswamy et al. |
| 2005/0027784 A1 | 2/2005 | Fusari |
| 2005/0027787 A1 | 2/2005 | Kuhn et al. |
| 2005/0044225 A1 | 2/2005 | Ota et al. |
| 2005/0080909 A1 | 4/2005 | Panasyuk et al. |
| 2005/0080915 A1 | 4/2005 | Shoemaker et al. |
| 2005/0097506 A1 | 5/2005 | Heumesser |
| 2005/0125529 A1 | 6/2005 | Brockway et al. |
| 2005/0125530 A1 | 6/2005 | Brockway et al. |
| 2005/0125560 A1* | 6/2005 | Brockway et al. ............. 709/249 |
| 2005/0125739 A1 | 6/2005 | Thompson et al. |
| 2005/0182838 A1 | 8/2005 | Sheets et al. |
| 2005/0198303 A1 | 9/2005 | Knauerhase et al. |
| 2005/0198310 A1 | 9/2005 | Kim et al. |
| 2005/0251855 A1 | 11/2005 | Brandstatter |
| 2005/0267972 A1 | 12/2005 | Costa-Requena et al. |
| 2005/0267974 A1 | 12/2005 | Panasyuk et al. |
| 2006/0010125 A1 | 1/2006 | Beartusk et al. |
| 2006/0015740 A1 | 1/2006 | Kramer |
| 2006/0026235 A1 | 2/2006 | Schwarz et al. |
| 2006/0026284 A1 | 2/2006 | Nguyen |
| 2006/0029063 A1 | 2/2006 | Rao et al. |
| 2006/0052998 A1* | 3/2006 | Michelman ..................... 703/22 |
| 2006/0053079 A1 | 3/2006 | Edmonson et al. |
| 2006/0053080 A1 | 3/2006 | Edmonson et al. |
| 2006/0069797 A1 | 3/2006 | Abdo et al. |
| 2006/0070131 A1 | 3/2006 | Braddy et al. |
| 2006/0112181 A1 | 5/2006 | Affaki |
| 2006/0136389 A1 | 6/2006 | Cover et al. |
| 2006/0142878 A1 | 6/2006 | Banik et al. |
| 2006/0143067 A1 | 6/2006 | Calabria |
| 2006/0143703 A1 | 6/2006 | Hopen et al. |
| 2006/0149567 A1 | 7/2006 | Muller et al. |
| 2006/0195895 A1 | 8/2006 | Ben-Shachar et al. |
| 2006/0230105 A1 | 10/2006 | Shappir et al. |
| 2006/0230156 A1 | 10/2006 | Shappir et al. |
| 2006/0230438 A1 | 10/2006 | Shappir et al. |
| 2006/0235851 A1 | 10/2006 | Akachi |
| 2006/0236325 A1 | 10/2006 | Rao et al. |
| 2006/0248180 A1 | 11/2006 | Bernardi et al. |
| 2006/0282855 A1 | 12/2006 | Margulis |
| 2007/0005595 A1 | 1/2007 | Gafter |
| 2007/0033290 A1 | 2/2007 | Valen, III et al. |
| 2007/0055650 A1 | 3/2007 | Duncan et al. |
| 2007/0061266 A1 | 3/2007 | Moore et al. |
| 2007/0094389 A1 | 4/2007 | Nussey et al. |
| 2007/0100900 A1 | 5/2007 | Gibbins |
| 2007/0124373 A1 | 5/2007 | Chatterjee et al. |
| 2007/0150551 A1 | 6/2007 | Krishnan et al. |
| 2007/0156687 A1 | 7/2007 | Idicula et al. |
| 2007/0156809 A1 | 7/2007 | Dickinson et al. |
| 2007/0162749 A1 | 7/2007 | Lim |
| 2007/0168525 A1 | 7/2007 | DeLeon, III et al. |
| 2007/0180448 A1 | 8/2007 | Low et al. |
| 2007/0192329 A1 | 8/2007 | Croft et al. |
| 2007/0198656 A1 | 8/2007 | Mazzaferri et al. |
| 2007/0203972 A1 | 8/2007 | Wewalaarachchi et al. |
| 2007/0233804 A1 | 10/2007 | Palekar et al. |
| 2007/0244966 A1 | 10/2007 | Stoyanov et al. |
| 2007/0245240 A1 | 10/2007 | Hudson, Jr. |
| 2007/0260738 A1 | 11/2007 | Palekar et al. |
| 2007/0282951 A1 | 12/2007 | Selimis et al. |
| 2008/0015927 A1 | 1/2008 | Ramirez |
| 2008/0034071 A1 | 2/2008 | Wilkinson et al. |
| 2008/0034408 A1 | 2/2008 | Duggal |
| 2008/0127348 A1 | 5/2008 | Largman et al. |
| 2008/0134314 A1 | 6/2008 | Hamid |
| 2008/0137133 A1 | 6/2008 | Trappe |
| 2008/0163171 A1 | 7/2008 | Chess et al. |
| 2008/0209538 A1 | 8/2008 | Malakapalli et al. |
| 2008/0222299 A1 | 9/2008 | Boodaei |
| 2008/0228865 A1 | 9/2008 | Cruzada |
| 2008/0235624 A1 | 9/2008 | Murata |
| 2008/0250407 A1 | 10/2008 | Dadhia et al. |

| | | | |
|---|---|---|---|
| 2009/0006537 | A1 | 1/2009 | Palekar et al. |
| 2009/0222531 | A1 | 9/2009 | London et al. |
| 2009/0222565 | A1 | 9/2009 | Ben-Shachar et al. |
| 2010/0023582 | A1 | 1/2010 | Pedersen et al. |

OTHER PUBLICATIONS

"Access to Work—Dev Design Specification", Microsoft Confidential, Version 1, pp. 1-25.

Baude et al., "Interactive and Descriptor-based Deployment of Object-Oriented Grid Applications," Proceedings 11th IEEE Intl Symposium on High Performance Distributed Computing, 2002, found at at<<http://citeseer.ist.psu.edu/cache/papers/cs/26702/http:zSzzSzwww-sop.inria.frzSzoasiszSzJulien.VayssierezSzpublicationszSzhpdc2002__vayssiere.pdf/baude02interactive.pdf>>, 10 pgs.

Bhatia et al., "Extending Grid Protocols onto the Desktop using the Mozilla Framework," Proceedings of GCE'06, 2006, found at <<http://www.cogkit.org/GCE06/papers/CameraReady_126.pdf>>, pp. 1-4.

Gelu, "Securing Access to External Networks with Authentication, Authorization and Accountability", found at <<http://www.loloweb.dyns.cx/files/gsec_gelu_laurent.pdf>>, GIAC Security Essentials Certification (GSEC), Apr. 7, 2004, pp. 1-19.

General, "Secure Foundations for Microsoft Terminal Services," accessible at <<http://www.giac.org/certified_professionals/practicals/gsec/3578.phpu>>, GSEC Practical V1.4b, Jan. 11, 2004, pp. 1-21.

Helander, et al., "eLearning for Engineering," 9th International Conference on Engineering Education, Session M5H, Jul. 23-28, 2006, 6 pgs.

"iShadow Desktop—The Universal Citrix ICA, Terminal Services RDP, and VNC Client", available at least as early as Jun. 27, 2007, at <<http://www.dabcc.com/showcontent.aspx?id=2420>>, pp. 1-4.

Jose, "Workspace Versioning and Configuration Management API", retrieved on Apr. 15, 2008 at <<http://www.reswhitepapers.com/documents/VirtualizedUserWorkspaceManagementBeyondDesktopManagement.pdf>>, Java Boutique, pp. 1-3.

Koetzing, "Centralizing Application Access with Visionapp Workspace Management 2008", retrieved on Apr. 15, 2008 at <<http://www.thomaskoetzing.de/index.php?option=com_content&task=view&id=266&Itemid=289>>, Thomas Koetzing, Mar. 26, 2008, pp. 1-5.

Lubonski et al., "An Adaptation Architecture to Improve User-Perceived QoS of Multimedia Services for Enterprise Remote Desktop Protocols", Next Generation Internet Networks, Apr. 18-20, 2005, pp. 149-156.

"M2 Access to Work—Dev Design Specification", Microsoft Confidential, Version 1.0, pp. 1-21.

MacDonald, "Secure Access of Network Resources by Remote Clients," accessible at <<http://www.sans.org/reading_room/whitepapers/vpns/759.php>>, GSEC version 1.3, SANS Institute, 2002, Feb. 20, 2006, pp. 1-22.

Mascolo et al., "XMILE: an XML based Approach for Incremental Code Mobility and Update," Automated Software Engineering, vol. 9, No. 2, Apr. 2002, found at <<http://www.cs.ucl.ac.uk/staff/c.mascolo/www/asemob.pdf>>, pp. 1-15.

Miles, "Implementing Windows Terminal Server and Citrix MetaFrame on IBM @ server xSeries Servers", found at <<http://www.redbooks.ibm.com/redpapers/pdfs/redp3629.pdf>>, International Business Machines Corporation, Apr. 2003, 60 pgs.

"ProLiant Essentials Integrated Lights-Out Advanced Pack", available at least as early as Jun. 27, 2007, at <<http://h18000.www1.hp.com/products/quickspecs/11052_div/11052_div.HTML>>, Hewlett-Packard, 2004, pp. 1-3.

"Remote Users Group Policies," retrieved on Oct. 3, 2007 at <<http://www.cleo.net.uk/index.php?category_id=332>>, CLEO, 2005, 6 pgs.

Rouse, "Managing Terminal Services with Group Policy," retreived on Oct. 3, 2007 at <<http://www.msterminalservices.org/articles/Managing-Terminal-Services-Group-Policy.html>>, Mar. 15, 2007, 11 pgs.

Smith, "S.H.A.U.N: Secure Hospital Access from the University Network," available at <<http://www.ja.net/community/nhs/shaun.pdf>>, Addenbrooke's NHS Trust, Jan. 2004, pp. 1-11.

"Technical Overview of Management Services," Microsoft Windows Server 2003, retrieved from <<http://download.microsoft.com/download/1/c/7/1c701994-9f8a-47c2-ad65-7265356c10eb/Manageover.doc>>, Jul. 2002, 47 pgs.

"Terminal Services Gateway (TS Gateway)", retrieved on Oct. 3, 2007 at <<http://technet2.microsoft.com/windowsserver2008/en/library/9da3742f-699d-4476-b050-c50aa14aaf081033.mspx?mfr=true>>, Microsoft Corporation, Sep. 24, 2007, 8 pgs.

Tsai, et al., "Towards Ubiquitous Computing via Secure Desktop Service," accessible at <<http://ieeexplore.ieee.org/iel5/7544/20542/00949577.pdf?isNumber=>>, IEEE Catalog No. 01CH37239, 2001, pp. 187-190.

"Using Terminal Services in Application Server Mode with Small Business Server 2000," retrieved on Oct. 10, 2007 at <<http://www.microsoft.com/technet/prodtechnol/sbs/2000/maintain/termsvcs.mspx>>, 2002, 13 pgs.

"Virtualized User Workspace Management for Windows Environments", retrieved at <<http://javaboutique.internet.com/articles/versioning/>>, RES Software, 2007, pp. 1-6.

"VMware Virtual Infrastructure", available at least as early as Jun. 27, 2007, at <<http://www.centriserv.com/products_vmware.php>>, CentriServ, 2006, pp. 1.

"Workspace Integration Into Win7 Networking UI—Feature Summary", Windows Server—Terminal Services Team, pp. 1-8.

"Workspace Runtime—Dev Design Specification", Microsoft Confidential, Version 1, pp. 1-15.

"TS Session Broker", Microsoft TechNet, Jan. 21, 2008, retrieved from the internet at <<http://technet.microsoft.com/en-us/library/cc732594(WS.10).aspx>>.

Non-Final Office Action for U.S. Appl. No. 12/163,673, mailed on Aug. 17, 2011, Ayesha M. Mascarenhas, "Integrated Client for Access to Remote Resources", 12 pages.

Office Action for U.S. Appl. No. 11/680,518, mailed on Aug. 2, 2011, Meher Malakapalli, "Strategies for Securely Applying Connection Policies via a Gateway".

Final Office Action for U.S. Appl. No. 12/103,542, mailed on Sep. 1, 2011, Ido Ben-Shachar, "Securely Pushing Connection Settings to a Terminal Server Using Tickets", 27 pages.

Office Action for U.S. Appl. No. 12/039,732, mailed on Dec. 23, 2011, Ido Ben-Shachar, "Centralized Publishing of Network Resources", 19 pgs.

Office Action for U.S. Appl. No. 11/771,921, mailed on Dec. 8, 2011, Ashwin Palekar, "Virtual Desktop Integration with Terminal Services", 20 pgs.

The Chinese Office Action mailed Dec. 14, 2012 for Chinese Patent application 200980107105.4, a counterpart foreign application of U.S. Appl. No. 12/039,725, 7 pages.

The Chinese Office Action mailed Mar. 3, 2012 for Chinese Patent application 200980107105.4, a counterpart foreign application of U.S. Appl. No. 12/039,725, 13 pages.

Office action for U.S. Appl. No. 12/039,732, mailed on Oct. 9, 2012, Ben-Shachar et al., "Centralized Publishing of Network Resources", 21 pages.

Office action for U.S. Appl. No. 11/771,921, mailed on Nov. 15, 2012, Palekar et al., "Virtual Desktop Integration with Terminal Services", 20 pages.

Office action for U.S. Appl. No. 12/039,732, mailed on Jun. 7, 2012, Inventor #1, "Centralized Publishing of Network Resources", 20 pages.

PCT International Search Report in Application PCT/US2008/066404, mailed Jan. 9, 2009, 2 pages.

PCT International Search Report in Application PCT/2009/032599 mailed Oct. 16, 2009, 7 pages.

PCT International Search Report and Written Opinion in Application PCT/US2008/053506, mailed Jun. 24, 2008, 6 pages.

PCT International Search Report and Written Opinion in Application PCT/US2009/032593, mailed Aug. 25, 2009, 12 pages.

Chinese Office Action mailed May 29, 2013 for Chinese Patent application 200980107105.4. a counterpart foreign application of U.S. Appl. No. 12/039,725, 12 pages.

(56) References Cited

OTHER PUBLICATIONS

Japanese Office Action mailed Jan. 18, 2013, for Japanese Patent application 2010-548775, a counterpart foreign application of U.S. Appl. 12/039,725, 9 pages.

Office action for U.S. Appl. No. 11/771,921, mailed on Jun. 10, 2013, Palekar et al., "Virtual Desktop Integration with Terminal Services", 25 pages.

RedCruise Corporation, "Front Line of RSS Media Business, Third Internet Media Following Email and Web, Part 1 Basics of RSS Technology, Part 2 Media Characteristics of RSS, Part 3 Examples of Use of RSS, Part 4 the Potential of RSS Is Limitless", Internet magazine make innovation with technology! No. 127, pp. 44-71, Impress Corporation, Japan, Aug. 1, 2005.

Russian Office Action mailed Feb. 6, 2013, for Russian Patent application 2010136035, a counterpart foreign application to U.S. Appl. No. 12/039,725, 5 pages.

Tulluch, et al., "Chapter 8, Enhancement of Functions of Termnal Service, 8.2 TS RemoteApp 8.3 TS Web Access", Introduction to Windows Server 2008 Technology, 1st Ed., pp. 202-216, Nikkei BP Soft Press, Inc., Japan, Nov. 2007.

Office action for U.S. Appl. No. 12/103,542, mailed on Jul. 5, 2013, Ben-Shachar et al., "Securely Pushing Connection Settings to a Terminal Server Using Tickets", 30 pages.

\* cited by examiner

INTEGRATED CLIENT FOR ACCESS TO REMOTE RESOURCES

BACKGROUND

In many environments, a single computer user has multiple computing devices he or she uses to perform computing tasks. For example, a corporate employee may have a work computer, a home computer, and a laptop computer. Each of these computer systems may be in and/or may move between different physical locations. However, the employee may desire uniform access to work related applications and work related data from any of his or her computer systems without regard to location. The computer user may also have a computing device with multiple operating systems installed in different partitions. The computer user may desire uniform access to applications running on all of the operating systems without switching interfaces.

Installing the same applications on all of the employee's computing devices can provide a common look and feel across all the computer systems. Installing the same applications on all the employee's computing devices can also provide access to corporate applications and corporate data in a uniform fashion across all of the computing devices. However, installing the same applications on multiple computing devices also has a number of drawbacks such as increased cost and limited central control over non-managed computing devices.

Since users understand and know how to launch resources on their local computers, administrators can ease the burden of accessing remote resources by pushing the resources and settings out to the local computers. However, this is only practical if both the host and local computers are in the same domain (e.g., Active Directory® domain (Microsoft Corporation, Redmond, Wash.)). Additionally, anything a user has to install locally means that the administrator has lost control of patching the resources or upgrading the application without the help of the user installing an additional package. Therefore, methods and systems that provide seamless and uniform access to non-local resources would have considerable utility.

SUMMARY

Techniques for discovering, connecting to, disconnecting from, reconnecting to, updating, removing, and other management of workspaces are described. A "workspace" is a collection of resources (local and/or remote of different types including types running on different operating systems) that a user can discover and use. Generally, implementations in accordance with the present disclosure allow a user to discover and manage workspaces from a user device such as a non-managed personal computer. Disclosed embodiments allow intuitive access to resources contained within a workspace by allowing those resources to behave like a locally-installed resource. One example of that behavior is the ability of remote applications to become the default application for launching local files.

After a user device discovers workspaces, the user device maintains a list of the discovered workspaces. Each of the workspaces contains resources, and shortcuts corresponding to those resources are integrated into a user interface (UI) of the user device (e.g., in a Start-Menu or on a Desktop). The user device receives a request from a user to access one of the workspace resources. In response to receiving that request, a connection is opened from the user device to the resource hosts containing the workspace. This connection enables access from the user device to the resources stored on the resource hosts by allowing a user to interact with the shortcuts and thus interact with the resources in the discovered workspaces. This interaction is similar to an interaction with local resources because the shortcuts appear integrated into the UI of the user device.

A client operating on the user device receives a locator (typically from the user) directing the client to a workspace feed server. The client looks to the workspace specified by the locator and queries that workspace feed server for resources stored on the resource hosts associated with the workspace. The client then creates shortcuts on the user device corresponding to those resources. The client also stores a description of the workspace on the user device. The client may also define management options unique to the specific workspace. The description is not the workspace itself; it is information about the workspace including a unique name of the workspace, the locator of the workspace, a list of the resources associated with the workspace, and a time of most recent update of the description of the workspace. The client also automatically integrates the shortcuts into the UI of the user device so that the UI presents the resources from the workspace as though they were local resources.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the use of the same reference numbers in different figures indicates similar or identical items. These drawings depict only typical embodiments of the invention and are not therefore to be considered to be limiting of its scope.

DETAILED DESCRIPTION

Figure 1:
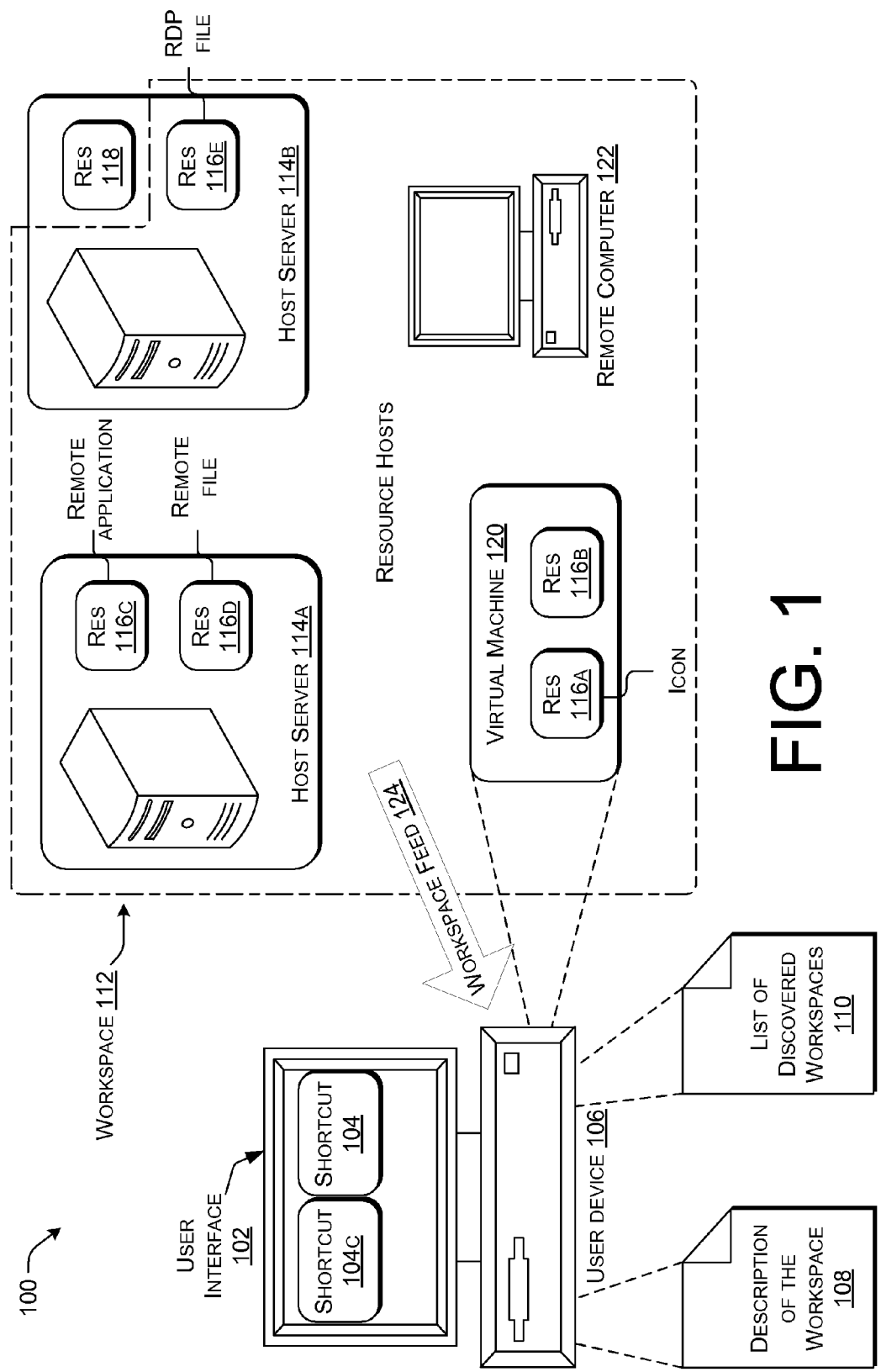
FIG. 1 illustrates a representation of an illustrative workspace in accordance with the present disclosure.

Existing options to discover and manage remote resources (e.g., applications, computers, websites, and/or files) from any non-managed computer (such as a user's home computer) are not intuitive and require the user to know and provide complex information. If the local computers are in a different domain than the corporation (i.e., non-managed desktops) there are only a few imperfect options such as terminal servers and/or remote desktop access to provide access to applications and data. A terminal server is a computer system that maintains applications that can be remotely executed by client computer systems. A remote desktop allows remote access (e.g., from home) directly to a desktop computer in another location (e.g., in the office) through a Virtual Private Network ("VPN"), over a terminal server ("TS") Gateway, or other system.

Accessing a terminal server via a terminal server web access (TSWA) web page published by the administrator is not entirely intuitive. TSWA requires a user of client computer system to direct a web browser to a web site presented by a web server that lists available remote application links (and potentially other content). The information needed to access an application through a remote desktop is also complex (e.g., computer name, Internet protocol address, and/or gateway settings). Solutions such as TSWA provide the administrator with the ability to manage the resources. However, they are limited in other ways, such as the inability to double click on a local file and automatically launch the remote application. There is no way for the user to choose to make a remote program the default file handler for a local file.

However, for a client computer system to access a remote application from a remote desktop (either at a terminal server or another desktop computer), the client computer system must be provided with a link from the administrator (e.g., computer name, Internet protocol address, gateway setting, and/or remote application initiation instructions in an RDP file) for accessing the remote application. Thus, even when using remote desktops, a user or administrator may be required to manually install a link for any remote applications a client computer system is to access.

Techniques for accessing and interacting with a collection of files, applications, and/or other resources grouped into a workspace are disclosed herein. Generally, embodiments of methods and computer readable media in accordance with the present disclosure advantageously provide an ability to discover and use remote resources that behave much like locally-installed resources. Behavior like locally-installed resources includes presence on the local UI similar to local resources (e.g., remote applications in the same menu as local application; remote printers in the same folder as local printers), clipboard access for remote resources, and toolbar integration. In addition, such embodiments allow the remote resources to be accessed from any computer connected to the appropriate network (such as the Internet). If the remote resources are centrally located, an administrator may efficiently add, remove and/or update the contents of a workspace. By grouping logically related resources into a workspace (e.g., resources for the human resources department of the fictitious Contoso Corporation) a user is better able to do things such as locate resources relevant to a given task, know that he or she has located all the relevant resources, and know that access to the resources is closed by closing the workspace.

Configuration of Workspaces

FIG. 1 illustrates a representation 100 of a workspace 112 in accordance with one or more embodiments of the present disclosure. In this embodiment, the workspace 112 is shown by a dashed line bounding the resources 116 included in the workspace 112. The resources 116 contained in a single workspace 112 may be spread across multiple resource hosts including host servers 114A and 114B, a remote computer 122, and/or a virtual machine 120 operating on the user device 106. Alternatively, an entire workspace may be contained on a single host server 114, remote computer 122, or virtual machine 120. The virtual machine 120 may, in some embodiments, be a partition of the user device 106 running an operating system different than the main partition of the user device 106.

The host servers 114 may include terminal servers, directories, directory services (e.g., Active Directory®), centralized publishing sources, or any other suitable hosts or sources. In some embodiments the remote computer 122 is itself a resource providing a remote desktop. The virtual machine 120, while not physically remote from the user device 106, is a virtual machine host that can provide resources such as resource 116A and resource 116B to the workspace 112. Physically remote devices such as the remote computer 122 and the host servers 114 may be identified as remote resource hosts. The resources 116 may include, for example, an icon 116A, a remote application 116C, a remote file 116D, a RDP file 116E, other software programs, data compilations, desktops, documents, and/or any other suitable resources. A given resource host may have some resources included in the workspace 112, such as resource 116E on host server 114B, and other resources excluded from the workspace 112, such as resource 118.

Shortcuts displayed on a UI 102 of user device 106 may correspond to local or remote resources. For example, shortcut 104C corresponds to remote application 116C on host server 114A. Shortcut 104 corresponds to a local resource. A user (not shown) may launch selected resources by clicking on the corresponding shortcuts 104C or 104, thus allowing the user to use a remote resource much like a locally-installed resource. The icon used to represent a particular shortcut may be supplied from the workspace rather than from an operating system or other software on the user device 106. For example, icon 116A on may be used to represent a shortcut (not shown) on the UI 102 corresponding to resource 116B.

Information sufficient to enable the user device 106 to access and manage resources 116 is provided from the workspace 112 to the user device 106 as a workspace feed 124. In some embodiments the workspace feed 124 is streamed from the workspace 112 to the user device 106. The workspace feed 124 may, for example, be an extensible markup language (XML) file. In some embodiments one workspace 112 is described by one workspace feed 124. The resources 116 in the workspace 112 are remote from the user device 106, but a description of the workspace 108 is stored on the user device 106. The description 108 provides information about the workspace 112 to enable the user device 106 to interact with the resources 116 of the workspace 112. In some embodiments the description 108 is provided by the workspace feed 124. This description is discussed in greater detail with reference to FIG. 4.

The user device 106 also stores a list of discovered workspaces 110. Discovering a workspace includes locating the workspace on a network (e.g., searching at a particular IP address and/or URL on the network), storing a description of the workspace 108 on the user device 106, and adding the workspace to a list of discovered workspaces 110. The list of discovered workspaces may be stored on the user device 106. Since a user device 106 may discover and interact with multiple workspaces, a list of discovered workspaces 110 assists with organization and management of the workspaces. The multiple workspaces may be available on a user device simultaneously or at different times. When a user device accesses multiple workspaces, organizing resources into workspaces provides the further advantage of allowing a user to readily know the source of a given resource. This is beneficial if, for example, a person with multiple employers is editing a confidential document for employer "A" and the respective workspaces for each employer include a word processing application. In this situation it is necessary to identify which word processing application is provided by employer "A."

Figure 2:
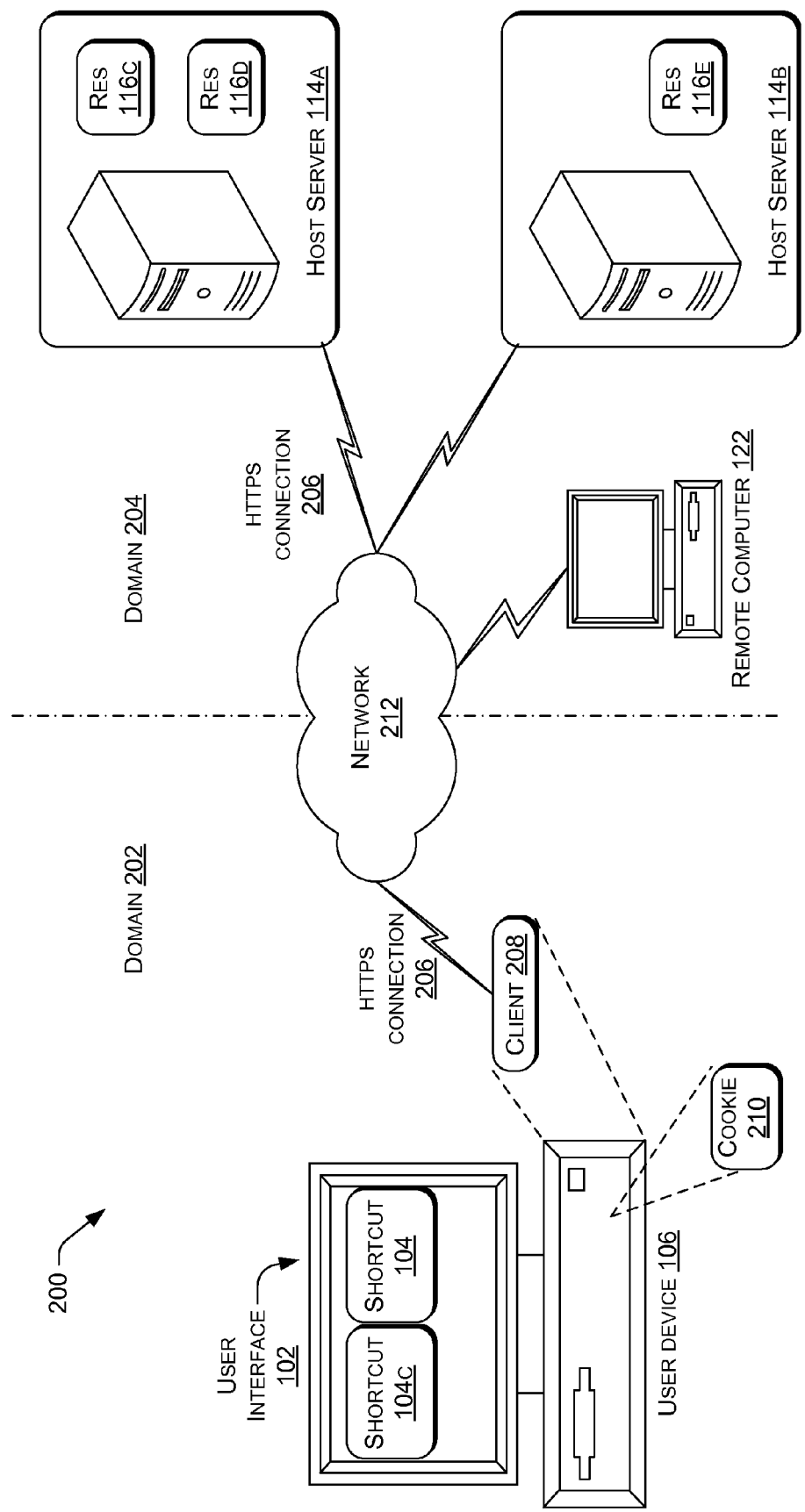
FIG. 2 illustrates an exemplary system for accessing workspace resources in accordance with an embodiment of the present disclosure.

FIG. 2 is an exemplary system 200 for accessing a workspace such as the workspace 112 of FIG. 1. In one embodiment, this system includes a user device 106 operatively communicating with remote computer 122 and host servers 114A and 114B via a network 212. Communication with the remote computer 122 and host servers 114 may be via a virtual guest machine or another host server. The network can be any type of network, such as, for example, a Local Area Network ("LAN"), a Wide Area Network ("WAN"), or even the Internet. In this description a "network" is one or more data links that enable the transport of electronic data between computer systems and/or modules. When information is transferred or provided over a network or another communications connection (either hardwired, wireless, or a combination of hardwired and wireless) to a computing device, the computing device interprets the connection as a source of computer-readable media. A workspace may function without a network; for example, a workspace containing resources drawn only from virtual machine hosts may be physically contained within user device 106.

As explained with reference to FIG. 1, each host server 112 has one or more resources 116 installed thereon. As noted above, the host servers 114 may include, for example, terminal servers, directories, directory services (e.g., Active Directory®), centralized publishing sources, or any other suitable hosts or sources. The remote computer 122 may include any computing device capable of having its own local resources (e.g., a desktop personal computer at a user's workplace or office). In some embodiments, the communication between the user computer 106 and the network 212 is mediated by a client 208 installed on the user device 106. The client 208 may be workspace specific. In some embodiments, each workspace has an associated client and all clients interact with a workspace runtime component of the operating system on the user device 106. Alternately, the client 208 may be installed on a variety of suitable platforms such as, for example, a cellular telephone, a personal data assistant (PDA), a mobile navigational device, a WiFi-enabled component, or any other suitable platform. The client 208 may be configured in a wide variety of ways to provide the desired functionalities and capabilities described herein.

Communication between the client 208 and the network 212 as well as communication between the network 212 and one or more host servers 114 or remote computers 122 may be a secure hypertext transfer protocol secure socket layer (https) connection 206. In some embodiments, the https connection transmits a small text file as a token that serves to identify the user (i.e., a cookie 210) between the user device 106 and the resource hosts. Access to a workspace may require the user to enter credentials such as a username and password. The use of a cookie 210 allows the credentials to be stored so that a workspace may be repeatedly accessed without re-entering credentials. In one embodiment, the user device 106 is in a different domain 202 than the domain 204 of the host servers 114 and the remote computer 122. Alternatively, each host server 114 and/or the remote computer 122 may be in different domains from each other (not shown). In other embodiments (not shown), the user device 106 may be in the same domain as any or all of the host servers and remote computers. Alternatively, the user device 106 and the host servers 114 may be non-domain-joined computers for example computers connected through an un-managed home network (not shown).

Figure 3:
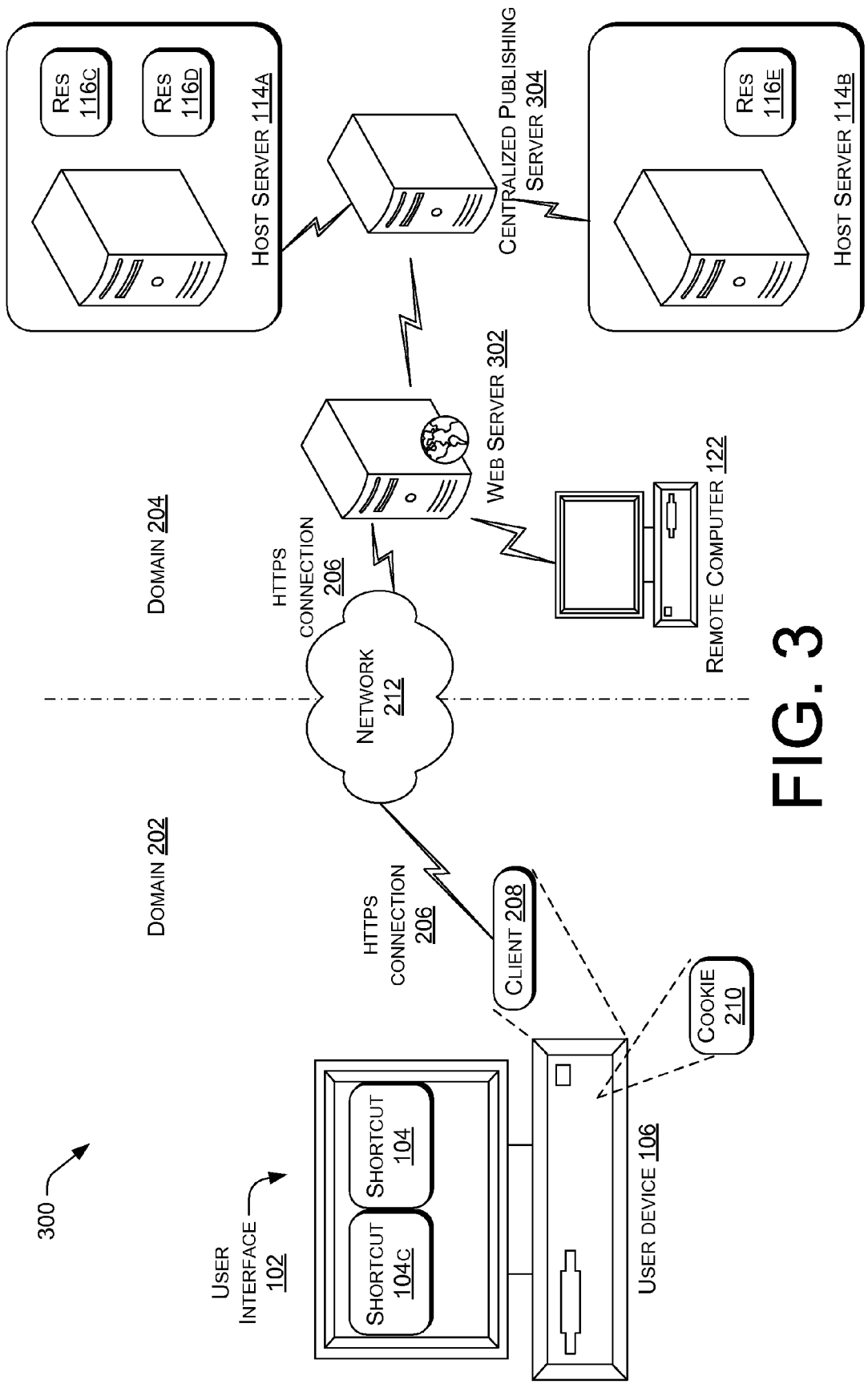
FIG. 3 illustrates an exemplary system including a web server for accessing a workspace in accordance with an embodiment of the present disclosure.

FIG. 3 is an exemplary system 300 similar that the exemplary system 200 of FIG. 2 but with the addition of a web server 302 and centralized publishing server 304. In the exemplary system 300 the host servers 114 are communicatively coupled to the network 212 via the centralized publishing server 304 and the web server 302. The web server 302, in other embodiments, may be any aggregator that maps a single URL to a plurality of host servers 114. The workspace feed 124 of FIG. 1 may be sent in some embodiments from the web server 302 to the client 106 via the network 212. In some embodiments, an existing web access system for accessing remote resources, such as the Terminal Services (TS) Web Access system available from Microsoft Corporation, may incorporate aspects of the present disclosure to provide improved service to users of remote resources. Other systems that enable remote access to resources via a network that may be used include, for example, PC-Duo® Remote Control available from Vector Networks (South Yorkshire, ENGLAND), products available from Citrix® (Citrix Systems, Inc., Ft. Lauderdale Fla.) or any other suitable remote network access systems.

In operation, the components of the client 208 may cooperatively obtain the data (resources) regarding the workspace 112, including communicating with the web server 302 to obtain a list of resources, and presenting the data in a UI 102 (e.g., displaying the icons and/or RDP files). In alternative embodiments, (such as that shown in FIG. 2) the client 208 communicates with host servers 114 without going through a web server. The client 208 may communicate with the web server 302 to obtain a list of resources. The list of resources is discussed more in connection with FIG. 4 below. The resources may, in one embodiment, be ultimately represented on the user device 106 as RDP files. When the client 208 presents the data in a UI 102, it may involve customizing the behavior and appearance of RDP files using shell extension handlers. The client 208 may act as a shell extension handler for RDP file types to customize the look and feel (e.g., view window, location, etc.) of RDP files in a displayed on the UI 102. In some embodiments, the client 208 parses the workspace feed 124 to extract supplementary files, icon files, and/or shortcuts.

Figure 4:
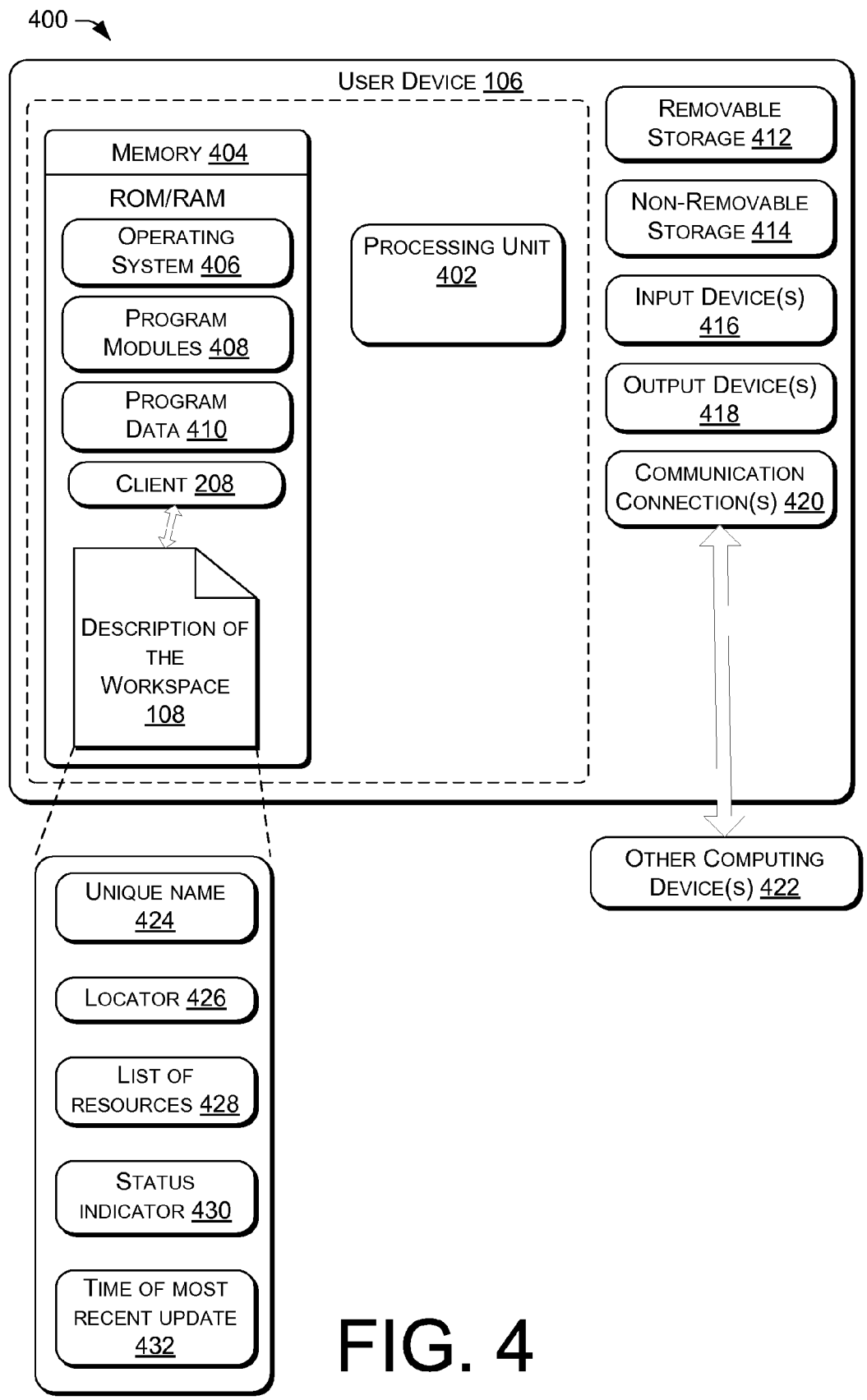
FIG. 4 is a schematic view of a user device of FIG. 1 in accordance with an embodiment of the present disclosure.

FIG. 4 is a schematic view 400 of the user device 106 in accordance with an embodiment of the present disclosure. In a basic configuration, the user device 106 includes at least one processing unit 402 and memory 404. Depending on the exact configuration and type of user device 106, the memory 404 may be volatile (such as RAM), non-volatile (such as ROM and flash memory) or some combination of the two. The memory 404 typically includes an operating system 406, one or more program modules 408, and may include program data 410. The memory 404 also includes a description of the workspace 108. The description of the workspace 108 includes, but is not limited to, a unique name 424 of the workspace, a locator 426 of the workspace, a list of resources 428 contained in the workspace, a status indicator 430 of the workspace, and/or a time of most recent update 432 of the workspace. The elements of the description of the workspace 108 are described in greater detail in the description of FIGS. 6-8. As an alternative embodiment, program modules 408, other modules, as well as the client 208 may be implemented as part of the operating system 406, or it may be installed on the computing device and stored in other memory (e.g., non-removable storage 414) separate from the memory 404. A workspace runtime component (not shown) handles tracking when a connection to a workspace has been started, when a connection has been closed, and/or when a connection has been disconnected.

As further shown in FIG. 4, the client 208 is stored in the memory 404. The client 208 is configured to operatively communicate with the network 212 to provide access to remote resources that behave much like locally-installed resources. A cookie 210 related to the workspace may also be stored in the memory 404 (not shown). The user device 106 may have additional features or functionality. For example, the user device 106 may also include additional data storage devices (removable and/or non-removable) such as, for example, magnetic disks, optical disks, or tape. Examples of such additional storage are illustrated by removable storage 412 and non-removable storage 414. Computer-readable storage media may include volatile and nonvolatile, removable and non-removable media implemented in any method or technology for storage of information, such as computer readable instructions, data structures, program modules, or other data. The memory 404, removable storage 412 and non-removable storage 414 are all examples of computer storage media. Thus, computer-readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by user device 106. Any such computer-readable storage media may be part of the device 400. User device 106 may also have input device(s) 416 such as keyboard, mouse, pen, voice input device, and touch input devices. Output device(s) 418 such as a display, speakers, and printer, may also be included. These devices are well known and need not be discussed at length.

The user device 106 may also contain communication connection(s) 420 that allow the device to communicate with other computing device(s) 422, such as over a network, for example the network 212 shown in FIGS. 2 and 3. Communication connection(s) 420 is one example of communication media. Communication media may typically be embodied by computer readable instructions, data structures, program modules, or other data in a modulated data signal, such as a carrier wave or other transport mechanism, and includes any information delivery media.

Various modules and techniques may be described herein in the general context of computer-executable instructions, such as program modules, executed by one or more computers or other devices. Generally, program modules include routines, programs, objects, components, data structures, and so forth for performing particular tasks or implementing particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

Use of Workspaces

Figure 5:
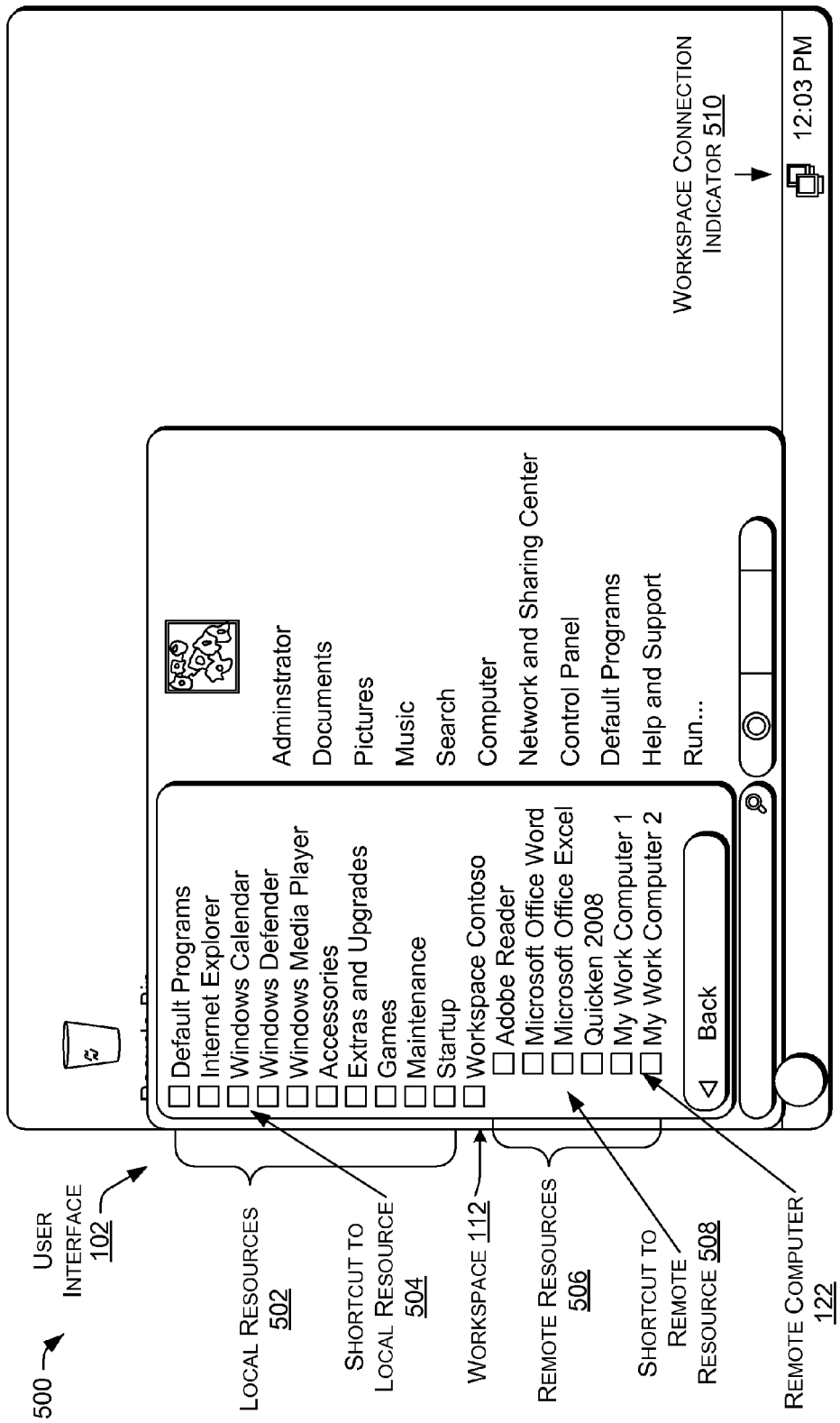
FIG. 5 is a representation of a UI integrating local resources and remote resources in accordance with an embodiment of the present disclosure.

FIG. 5 shows a view 500 of the UI 102 of user device 106. In some embodiments, this UI 102 is a desktop of a computing device with the UI presenting multiple windows to the user. In this embodiment, workspace 112 is represented in a menu as "Workspace Contoso." The menu lists local resources 502 together with remote resources 506. The remote resources 506 are shown in the menu hierarchy as elements contained within the workspace 112. Each listing in the menu may be a shortcut such as the shortcuts shown in FIGS. 1-3. For example, shortcut to local resource 504 in the menu may correspond to shortcut 104 shown in FIGS. 1-3. Shortcut to remote resource 508 may correspond shortcut 104C shown in FIGS. 1-3. Additionally, the menu item "My Work Computer 2" may correspond to the remote computer 122 of FIGS. 1-3. The UI 102 may also display a workspace connection indicator 510 showing if the user device 106 is currently connected to any workspaces. In an alternative embodiment, the UI may be largely or entirely text based. In that embodiment, local resources 502 and remote resources 506 are presented in the same manner, regardless of that manner being a menu or other UI.

Figure 6:
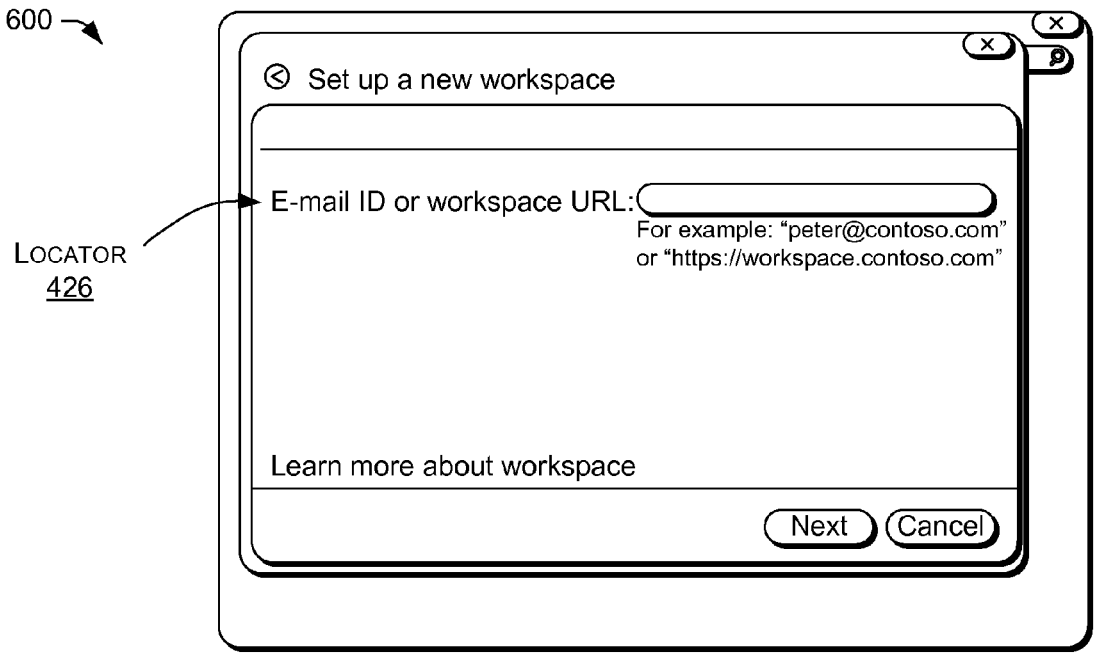
FIG. 6 is a representation of a UI entering a locator in accordance with an embodiment of the present disclosure.

FIG. 6 shows a view 600 of the UI 102 for entering a locator 426 to the workspace. To discover a workspace, the user directs the user device 106 to the location of a workspace 112 by entering the locator 426. The user device 106, or in some embodiments the client 208, are directed to a specific electronic address on a network 212. In some embodiments, an administrator may give the user a uniform resource locator (URL) to point the client 208 toward (e.g., https://workspace.contoso.com). The URL could be provided through an electronic communication system, and does not necessarily preclude that the user has to specifically configure the client 208 with the URL. In alternative embodiments, the user enters an e-mail address as the locator 426. This is advantageous because most users are better able to remember their own e-mail address than a URL or other locator. The domain-part of the e-mail address is used to create a Domain Name System (DNS) service record (SRV) query to locate the workspace 112. For example, peter@contoso.com is interpreted by a workspace wizard/configuration manager to create a DNS SRV query for contoso.com and then uses the returned service information to construct a URL (e.g., https://workspace-.consoso.com/) that points to Workspace Contoso. In one embodiment, a configuration-file stores the URL and matches the e-mail address with the URL. Once the client 208 is configured and authenticated, a menu on the user device 106 (e.g., the menu shown in FIG. 5) may include remote resources that the administrator has made available to users of the workspace. In some embodiments, this is a one-time configuration of the workspace via a shell-integrated client 208 on the user device 106. In other embodiments, the workspace is configured by a configuration-file which an administrator can send to users through e-mail, a web-page link, or other mechanism.

Figure 7:
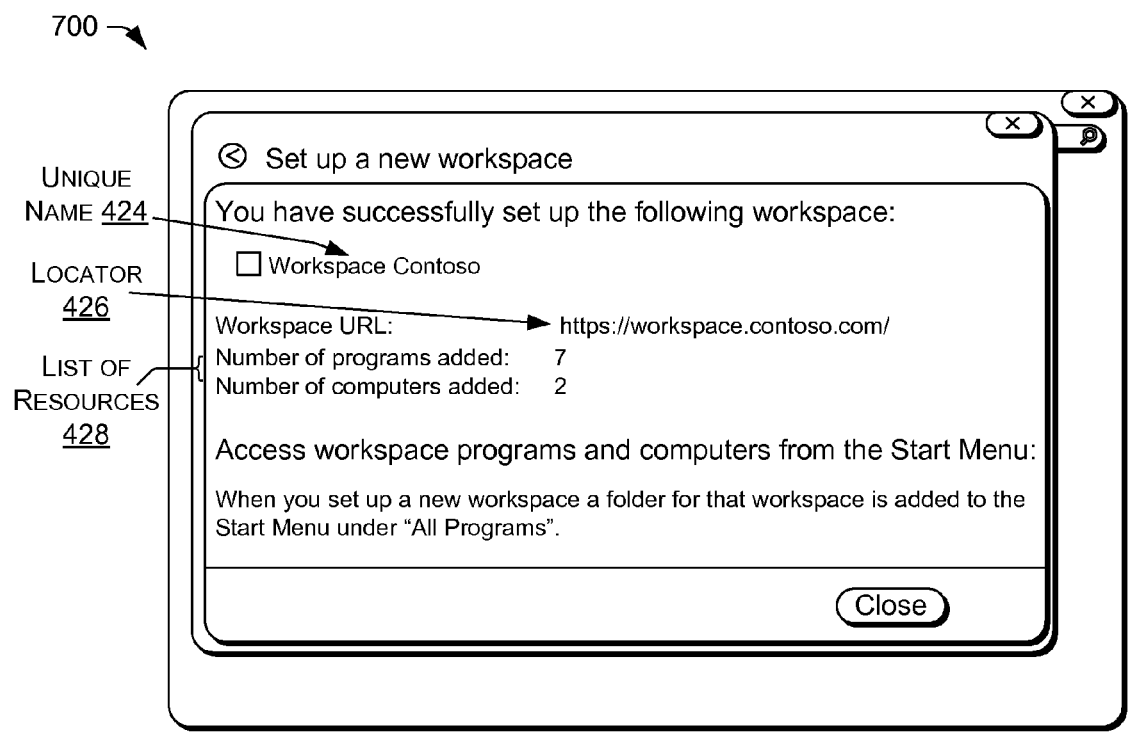
FIG. 7 is a representation of a UI showing discovery of a workspace in accordance with an embodiment of the present disclosure.

FIG. 7 shows a view 700 of a UI 102 after successful discovery of a new workspace. This view 700 provides the user with an overview of a newly discovered workspace following successful set up of that workspace. The overview includes the unique name 424 of the workspace, the locator 426 of the workspace, and a list of resources 428 contained in the workspace. Since a single user device 106 may interact with multiple workspaces, each workspace is identified by a unique name 424 (e.g., Workspace Contoso). In this embodiment, the locator 426 is a URL (e.g., https://workspace.consoso.com/). The list of resources 428 includes the number and type of the resources.

Figure 8:
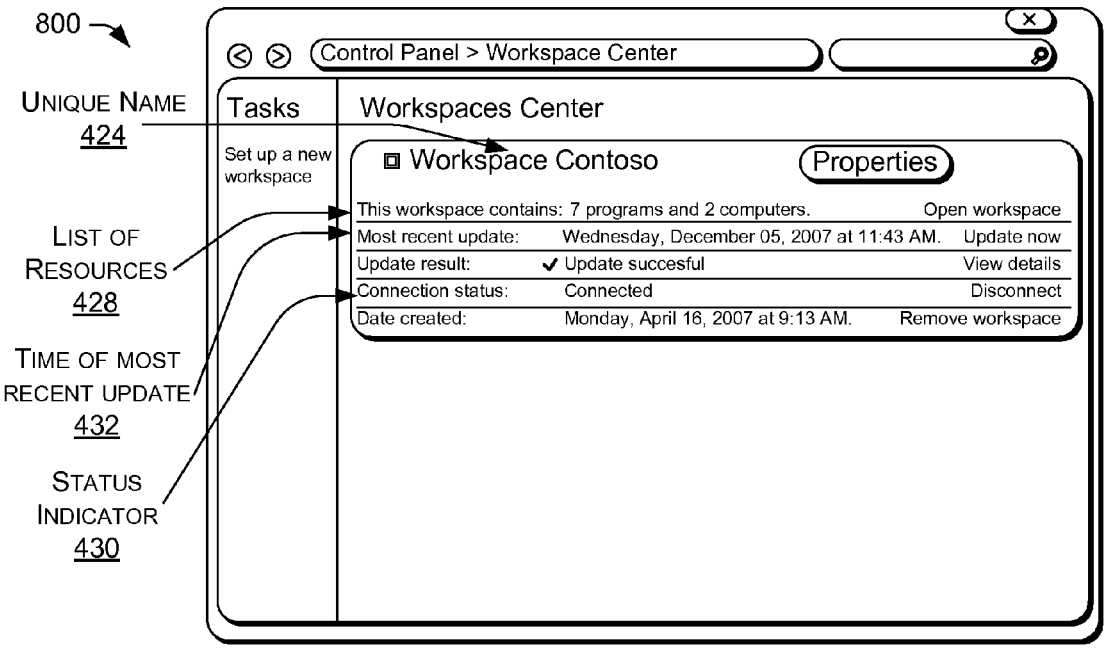
FIG. 8 is a representation of a UI showing a workspace center in accordance with an embodiment of the present disclosure.

FIG. 8 is a view 800 of a UI 102 showing a workspace center listing discovered workspaces. In this view 800 only one workspace (e.g., Workspace Contoso) is shown. In other embodiments, multiple workspaces may be shown in this view 800. Similar to the view 700 shown in FIG. 7, this view 800 additionally includes the unique name 424 of the workspace, and a list of resources 428 including the number and type of the resources. This view 800 also shows a status indicator 430 that displays the status of the workspace as either connected or disconnected. In some embodiments, following initial discovery of a workspace, the user device 106 automatically connects to the workspace 112. Once discovered a workspace may be disconnected without deleting or "un-discovering" the workspace. Accordingly, the workspace center may show a number of workspaces, all of which have been discovered, some of which are currently connected, and some of which are currently disconnected.

The view 800 of FIG. 8 also shows the time of most recent update 432 (e.g., Wednesday, Dec. 5, 2007 at 11:43 AM). Changes made to the workspace 112 or remote resources 116 may not be reflected in the description of the workspace 108 stored on the user device 106. It may be of interest to the end-user that their user device should constantly grant them seamless access to all available network resources. As changes in the resources 116 associated with discovered workspaces occur, the end-user would like them to be reflected on their user device 106 (or other platform). A synchronization mechanism may be implemented to automatically accomplish this synchronization between the user device 106 configuration and the published resource data. For example, in some embodiments, a process on the user device 106 may periodically initiate a dynamic check of resource hosts (e.g., host servers 114, remote computers 122, and virtual machines 120) associated with a workspace 112, download a list of resources, compare it to the list of resources 428 stored on the user device 106, and update the list of resources 428 to incorporate any changes. In one embodiment, a cookie 210 placed on the user device 106 by the resource hosts provides authentication information in lieu of a username and/or password. The cookie 210 allows synchronization without the need to periodically prompt the user for a password or to save a company password on a non-managed home computer. The user may also manually force the dynamic check rather than waiting for the next scheduled synchronization. In some embodiments, automatic updates will be scheduled by a task scheduler service on the operating system 406 responsible for running tasks at a time predetermined by the user. The task may be created by a workspace setup wizard/configuration manager.

Because a list of resources 428 file may describe dozens or even hundreds of available resources, such an auto-synchronization mechanism may require significant resource overhead for both the user device 106 and the web server 302 or host servers 114. Since most published resources will remain the same for long periods of time, it may be possible to significantly reduce the overhead burden associated with such synchronization activities by providing timestamp information for each resource 116 in a workspace 112. The timestamp information for each of the available resources enables the user device 106 to determine whether each of the available resources has been modified from a previously-available resource version. In some embodiments, this allows the client 208 to analyze the timestamp information and download supplementary files (such as RDP files and icons) for resources that have changed. This synchronization mechanism may require each resource to undergo some processing at each synchronization, and may require the user device 106 to retain some data for each remote resource (e.g., in the form of a "most recent update" time value). The processing may include parsing of the resource to update the presentation to the user, creating new aggregations of resources, changing the association of the resources to different agents.

Figure 9:
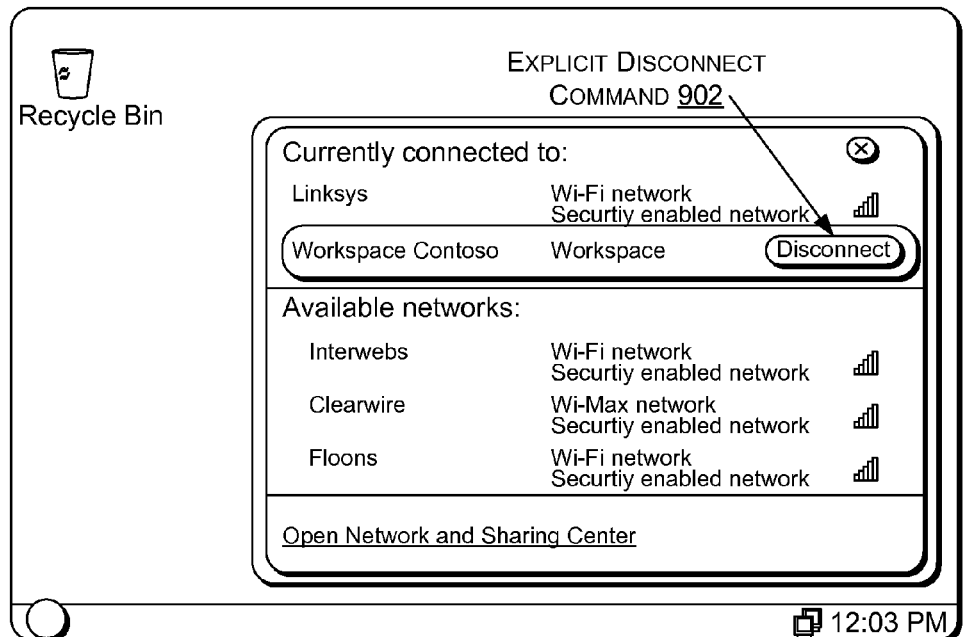
FIG. 9 is a representation of a UI showing an explicit disconnect command in accordance with an embodiment of the present disclosure.

FIG. 9 shows a view 900 of a UI 102 including an explicit disconnect command 902. Once discovered and connected a user may desire to disconnect from a workspace, for example, to prevent unauthorized access to the contents of that workspace. In some embodiments, disconnection is performed by an explicit disconnect command 902 such as a disconnect button. In other embodiments, a workspace may "time-out" and then disconnect. For example, after the resources (e.g., remote applications, remote files, and remote desktops) associated with a workspace 112 are closed, the user device 106 remains connected to the workspace 112 for a defined period of time (i.e., a period of time set by the user or alternatively an administrator) and then disconnects. When the user device 106 disconnects from a workspace 112 the user device 106 (or in some embodiments a client 208) generates a confirmation that the workspace is closed. Providing a confirmation allows a user to definitively know that a workspace 112 and thus resources 116 contained in that workspace are closed and no longer immediately available from the user device 106. For example, in situations where a user wishes to close all resources associated with work, the simplicity and clarity of closing one workspace is advantageous compared to searching for separate resources and confirming that each resource is closed. In one embodiment, a reconnect button is presented to the user after closing a workspace 112. Providing a "one-click" means for reconnecting to a workspace will allow a user who accidently closed a workspace 112 to easily return to the task he or she was working on when the workspace 112 closed.

Connection status of workspaces may be presented to the user in multiple ways. In some embodiments, a list of connected workspaces may be presented in a view 900 such as the view shown in FIG. 9. The UI 102 may also display a workspace connection indicator 510 showing if the user device 106 is currently connected to any workspaces. Other indicators of workspace connection such as different visual or audio signals to the user are also contemplated.

Figure 10:
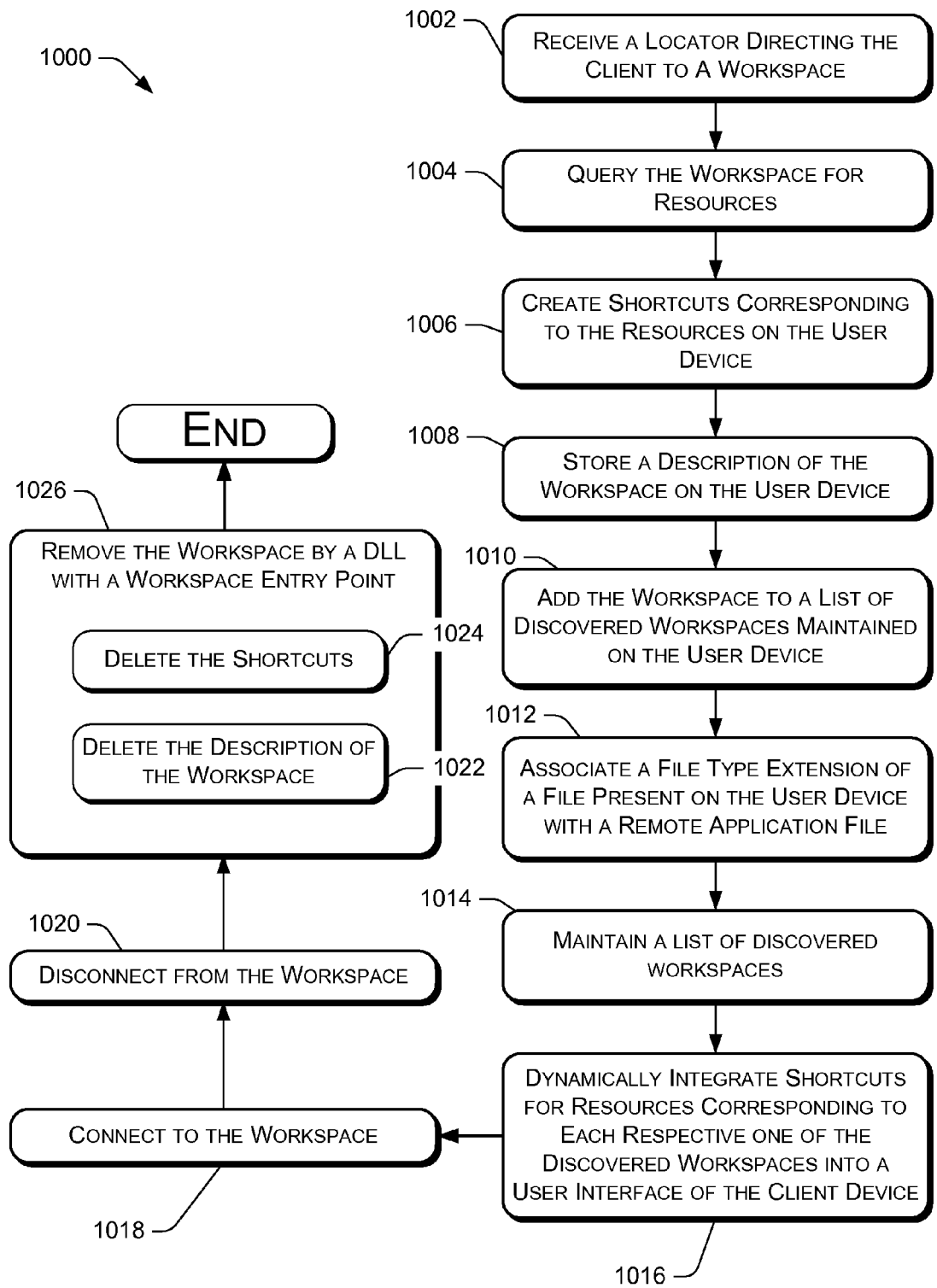
FIG. 10 is flowchart of a process for discovering and removing a workspace in accordance with an embodiment of the present disclosure.

FIG. 10 is a flowchart of an illustrative process 1000 of discovering and removing a workspace from a user device 106. At 1002, the process 1000 receives a locator (such as a URL or e-mail address) directing the client 208 to a workspace 112. The client 208 then queries the location indicated by the locator for resources associated with the workspace 112 (at 1004). The process 1000 then creates shortcuts corresponding to the resources on the user device at 1006. As discussed above, the shortcuts can be presented in a menu or other UI of the user device 106. At 1008 the process 1000 stores a description of the workspace on the user device. This description may be the description of the workspace 108 discussed above. Next, the process 1000 at 1010 adds the workspace to a list of discovered workspaces maintained on the user device 106. This list may be the same as the list of discovered workspaces 110 discussed above. Thus, at this point in process 1000, a unique name 424 (or other identifier such as a hash of a URL address) of each discovered workspace is included in a list stored on the user device 106, a description of each discovered workspace 108 is also stored on the user device 106, and shortcuts 104C corresponding to resources for each discovered workspace are created on the user device 106. A file type extension of a file present on the user device 106 is associated with a remote application file at 1012. For example, file "file.abc" is opened by remote application "ABC.exe" located on a host server 114 in the workspace 112. When an administrator removes or adds resources available to the user by changing the contents of a workspace 112, these changes may be mirrored on the user device 106 and the file associations may be updated accordingly. From this point on, when a user selects a file, it may open in either a local or remote resource if one exists that can handle that file type. In some embodiments, remote applications are able register as file extension handlers so that users can choose to make a remote application the default file extension handler.

Process 1000 continues by maintaining a list of discovered workspaces at 1014 on the user device 106. This list may be the same as the list of discovered workspaces 110 discussed above. Once discovered, the shortcuts and description of the workspace remain on the user device until the workspace is removed. Thus, even if a workspace is closed (but not removed) it remains in a list of discovered workspaces (at 1014). Next, the process 1000 dynamically integrates shortcuts for resources corresponding to each respective one of the discovered workspaces in a UI of the user device 106 (at 1016). This integration allows remote resources to show up like local resources on the user device 106 without requiring any "installer" technology. Integration without an "installer" allows the integration of the remote resources into the UI to dynamically change as the workspace changes. For example, a change in the name of a resource at the resource host can be dynamically reflected by a change in the label of a UI-integrated icon representing that resource. At this point the workspace 112 is fully discovered and a user of the user device 106 may connect to the workspace 112 (at 1018) or disconnect from the workspace (at 1020). Connection and disconnection are discussed in more detail in FIG. 11. Additionally, a workspace can be completely removed from a user device 106. This may be appropriate if a public computer (such as in a library or Internet café) is used to access a workspace. In one embodiment, shown at 1026, the workspace 112 is removed by a dynamic link library with a workspace entry point. Removal of a workspace includes deleting the shortcuts for resources in that workspace (at 1024) and deleting the description of the workspace (at 1022). After removal, the workspace 112 must be discovered again before it can be accessed from the user device 106.

Figure 11:
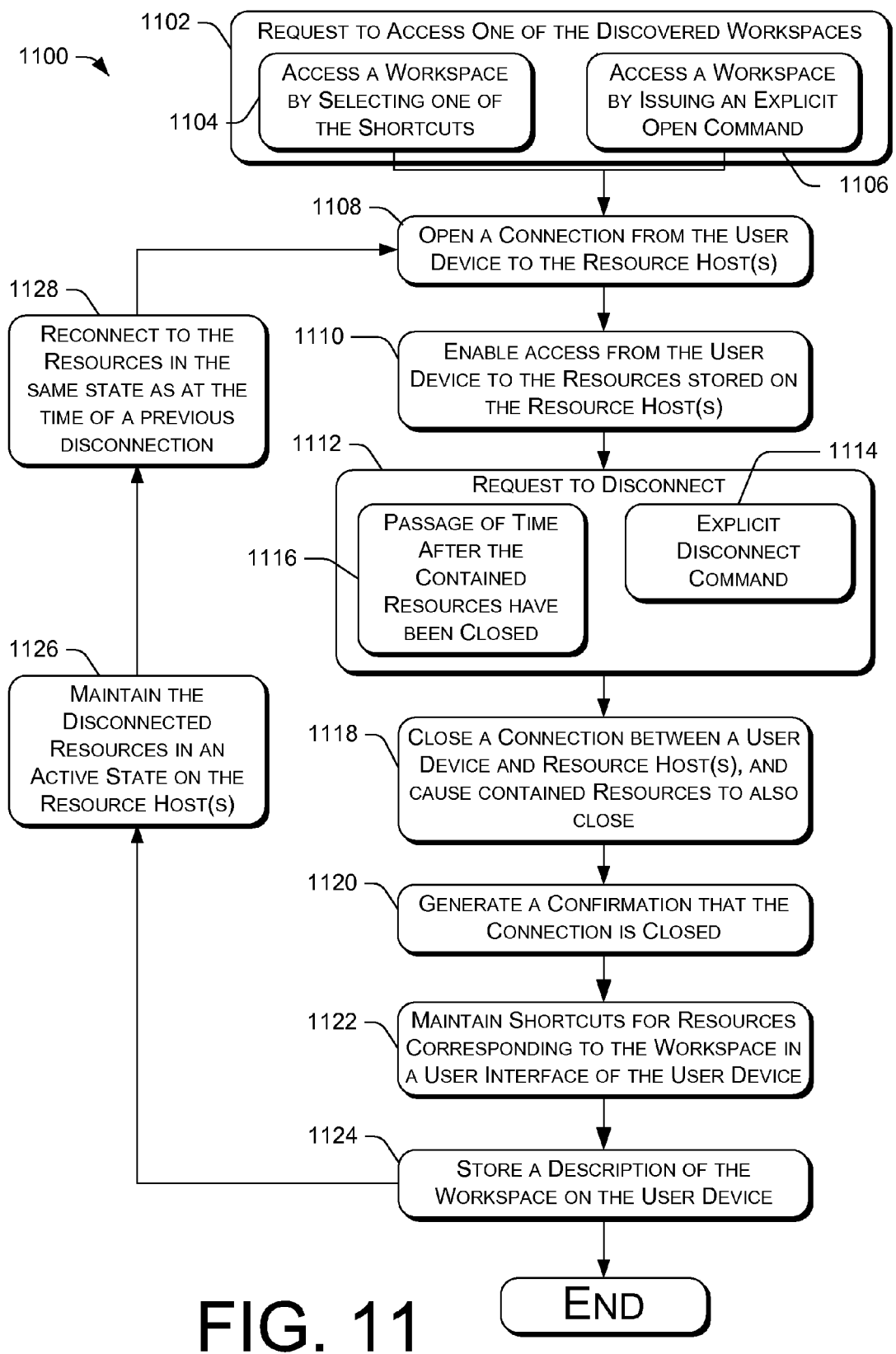
FIG. 11 is flowchart of a process for connection to, disconnection from, and reconnection to a workspace in accordance with an embodiment of the present disclosure.

FIG. 11 is a flowchart of a process 1100 for connecting to, disconnecting from, and reconnecting to workspaces in accordance with another embodiment of the present disclosure. Process 1100 begins at 1102 by receiving a request to access one of the resources in a discovered workspace (for example, a workspace discovered by the process 1000 of FIG. 10). In one embodiment the request may be a selection of a shortcut (at 1104). For example, selection of shortcut to remote resource 508 displayed in the menu shown on FIG. 5 is a request to open "Workspace Contoso." In an alternative embodiment at 1106, a request to open a workspace may be an explicit open command. At 1108, a connection is opened from the user device 106 to the resource hosts containing the workspace 112. For example, to access the workspace 112 of FIG. 1, a connection is made to virtual machine 120, remote computer 122, host server 114A and host server 114B. At 1110, the process 1100 enables access from the user device to the resources 116 stored on the resource hosts. Referring again to FIG. 1, in one embodiment this is access to resources 116A through 116E and remote computer 122.

A user may disconnect from a connected workspace by making a request to disconnect (at 1112). In one embodiment, at 1116, the request is passage of a defined period of time after all the resources contained in a workspace have been closed. In another embodiment, at 1114, the request is an explicit disconnect command such as the explicit disconnect command 902 shown on FIG. 9. Process 1100 next closes the connection between the user device and the resource hosts at 1118. The workspace runtime component (not shown) provides an interface that workspace resources can use to register with the workspace runtime to let it know when they are connected. In addition a connection handler (not shown) can notify registered connections when they need to disconnect. The workspace runtime maintains a list of active connections within a workspace 112 and determines that the workspace 112 is no longer connected once all these connections have closed OR when the user explicitly decides to disconnect from the workspace.

Closing the connection to the resource hosts causes the user device 106 to close its connection to the resources contained in those resource hosts (again at 1118). At 1120, the process 1100 generates a confirmation that the connection is closed as discussed above. Although the connection is closed, the workspace 112 is not removed, and shortcuts for resources 104C corresponding to the closed workspace are maintained on the UI 102 of the user device 106 (at 1122). In one embodiment, the remote resources 506 shown in FIG. 5 would appear differently when "Workspace Contoso" is closed (e.g., grayed out). A description of the workspace is stored on the user device (at 1124) even when the workspace is closed. This is the end of process 1100 until the user desires to reconnect with the workspace.

The workspace is closed from the perspective of a user of the user device 106; however, the resources remain in an active state on the resource hosts (at 1126). The user can disconnect an entire workspace session and is later able to re-connect to a single application (returning to its state when it was disconnected) as well as to re-connect to the entire workspace session. Process 1100, reconnects to the resources in the same state as at the time of a previous disconnection (at 1128).

CONCLUSION

Although the subject matter has been described in language specific to structural features and/or methodological acts, it is to be understood that the subject matter defined in the appended claims is not necessarily limited to the specific features or acts described. It will be appreciated that, based on the teachings of the present disclosure, a variety of alternate embodiments may be conceived, and that the present disclosure is not limited to the particular embodiments described herein and shown in the accompanying figures. Rather, the specific features and acts are disclosed as exemplary forms of implementing the claims.

What is claimed is:

1. A method comprising:
maintaining a list of discovered workspaces on a user device, wherein each of the discovered workspaces is associated with a location on a network;
dynamically integrating shortcuts for resources corresponding to each respective one of the discovered workspaces into a user interface (UI) of the user device, wherein the resources comprise a remote application;
receiving a request to access one of the resources corresponding to one of the discovered workspaces;
responsive to receiving the request, opening a connection from the user device to one or more resource hosts containing the resources corresponding to the indicated one of the discovered workspaces;

enabling access from the user device to the resources stored on the resource host(s) corresponding to the indicated one of the discovered workspaces by presenting shortcuts for resources corresponding to the discovered workspaces as though they were local resources, wherein the local resources and the remote resources are listed together in a start menu; and displaying a workspace connection indicator on the user interface separately from the start menu, wherein the workspace connection indicator is displayed when the connections to the discovered workspaces remain open and the workspace connection indicator is not displayed when the connections to the discovered workspaces are closed.

2. The method of claim 1, wherein the opening comprises reconnecting to the resources, wherein if the resources were previously opened and then disconnected, the resources are maintained in an active state on the resource host(s) such that the resources are in the same state at the time of reconnection as at a time of a previous disconnection.

3. A method of disconnecting from a workspace, the method comprising:

receiving a request to disconnect from a connected workspace;

responsive to receiving the request, closing a connection between a user device and resource hosts containing resources corresponding to the connected workspace, the closing of the connection causing the contained resources to also close;

generating a confirmation that the connection is closed;

maintaining shortcuts for resources corresponding to the workspace in a user interface (UI) of the user device when the connection is closed; and if other workspaces remain open, displaying a workspace connection indicator on the user interface separately from the shortcuts for resources corresponding to the workspace and, if connections to the other workspaces are closed, removing the workspace connection indicator from the user interface.

4. The method of claim 3, wherein the request comprises an explicit disconnect command or passage of a defined period of time after the contained resources have been closed.

5. The method of claim 3, further comprising:

storing a description of the workspace on the user device, the description comprising a unique name of the workspace, a locator of the workspace, a list of the resources associated with the workspace, and a status indicator of the workspace indicating connected or disconnected status.

6. One or more computer-readable storage media containing instructions that, when executed by a computer, perform acts comprising:

establishing a connection to one or more resource hosts; and operating a client on the user device, the client configured to perform acts comprising:

receiving one or more locators directing the client to one or more workspaces;

receiving, from a web server, a workspace feed associated with a workspace specified by the one or more locators;

parsing the workspace feed to extract information about the workspace including resources stored on the resource host(s) associated with the workspace;

creating shortcuts corresponding to the resources on the user device;

storing a description of the workspace on the user device, the description comprising a unique name of the workspace, the locator of the workspace, a list of the resources associated with the workspace, a status indicator of the workspace as either connected or disconnected, and a time of most recent update of the description of the workspace;

automatically integrating the shortcuts into a user interface (UI) of the user device and using the shortcuts to present the resources as though they were local resources on the user device;

repeating the receiving the workspace feed, parsing, creating shortcuts, storing, and automatically integrating for each of the one or more locators;

displaying a workspace connection indicator on the user interface separately from the shortcuts if the status indicator for one of the one or more workspaces is connected, and not displaying the workspace connection indicator if the status indicator of each of the one or more workspaces is disconnected; and associating a file type extension of a file present on the user device with a resource stored on a resource host, wherein the associating enables a file present on the user device with a same file type extension to be opened by the resource stored on the resource host.

7. The computer-readable storage media of claim 6, wherein the user device is in a different domain than the resource host(s) or connected to the resource host(s) through a non-domain joining.

8. The computer-readable storage media of claim 6, wherein the one or more locators comprise one or more e-mail addresses.

9. The computer-readable storage media of claim 6, wherein the acts further comprise:

receiving an e-mail address;

creating a Domain Name System (DNS) service record (SRV) query based at least in part on a domain part of the e-mail address; and sending the DNS SRV query to the client to be used as a locator.

10. The computer-readable storage media of claim 6, wherein the resource hosts comprise virtual machine hosts.

11. The computer-readable storage media of claim 6, wherein the resources comprise at least one of remote applications, remote files, icons, or remote desktop protocol (RDP) files.

12. The computer-readable storage media of claim 6, further comprising:

creating a secure hypertext transfer protocol secure socket layer (https) connection between the client on the user device and the web server, wherein the https connection transmits a text file that includes a username and password for accessing the workspace.

13. The computer-readable storage media of claim 6, further comprising:

adding the workspace to a list of discovered workspaces maintained on the user device.

14. The computer-readable storage media of claim 6, further comprising:

removing the workspace from the user device, wherein the removing comprises deleting the shortcuts and the description of the workspace from the user device.

15. The method of claim 14, wherein the removing is performed by a dynamic link library (dll) with a remove-workspace entry point.

16. The computer-readable storage media of claim 6, further comprising:

associating a file type extension of a file present on the user device with one of the resources, wherein the one of the resources is a remote application file.

17. The method of claim 1, wherein the resources comprise an icon supplied from a one of the discovered workspaces and the icon is displayed in the UI of the user device.

18. The method of claim 1, further comprising:
associating a file type extension of a file present on the user device with the remote application.

19. The method of claim 3, further comprising:
responsive to closing the connection, presenting a reconnect button in the UI of the user device that, when activated, connects the user device to the workspace without additional input.

20. The computer-readable storage media of claim 6, wherein the workspace feed comprises an extensible markup language (XML) file.

* * * * *